US012428086B2

(12) United States Patent
Piantini

(10) Patent No.: US 12,428,086 B2
(45) Date of Patent: Sep. 30, 2025

(54) STORAGE CONTAINER FOR A RIDEABLE SADDLE VEHICLE

(71) Applicant: PIAGGIO & C. SPA, Pontedera (IT)

(72) Inventor: Giacomo Piantini, Pontedera (IT)

(73) Assignee: PIAGGIO & C. SPA, Pontedera (IT)

( * ) Notice: Subject to any disclaimer, the term of this patent is extended or adjusted under 35 U.S.C. 154(b) by 153 days.

(21) Appl. No.: 18/039,784

(22) PCT Filed: Jan. 18, 2022

(86) PCT No.: PCT/IB2022/050384
§ 371 (c)(1),
(2) Date: Jun. 1, 2023

(87) PCT Pub. No.: WO2022/167879
PCT Pub. Date: Aug. 11, 2022

(65) Prior Publication Data
US 2024/0092443 A1 Mar. 21, 2024

(30) Foreign Application Priority Data

Feb. 2, 2021 (IT) .......................... 102021000002147

(51) Int. Cl.
*B62J 9/23* (2020.01)
*B62J 9/14* (2020.01)
*E05F 1/12* (2006.01)

(52) U.S. Cl.
CPC . *B62J 9/23* (2020.02); *B62J 9/14* (2020.02); *E05F 1/12* (2013.01);
(Continued)

(58) Field of Classification Search
CPC ....... B62J 9/14; B62J 9/23; E05F 1/12; E05Y 2999/00; E05Y 2201/266; E05Y 2201/716; E05Y 2900/538
(Continued)

(56) References Cited

U.S. PATENT DOCUMENTS

| 4,426,752 A | 1/1984 | Nakayama |
| 9,415,821 B2 | 8/2016 | Oishi |

(Continued)

FOREIGN PATENT DOCUMENTS

| CN | 110027650 A | 7/2019 |
| DE | 102013220335 A1 | 4/2015 |

(Continued)

OTHER PUBLICATIONS

International Search Report for corresponding application PCT/IB2022/050384 filed Jan. 18, 2022; Mail date May 4, 2022.
(Continued)

*Primary Examiner* — Peter N Helvey
(74) *Attorney, Agent, or Firm* — CANTOR COLBURN LLP

(57) ABSTRACT

A storage container for a rideable saddle vehicle, the container including a containment body having a base and a cover hinged to the base and adapted to be pivotally moved along a stroke extending between an angular closing position and an angular opening position, where the storage container has at least one braking device coupled to, or integrated in, the containment body, which is adapted and configured to slow down the movement of the cover along at least part of the stroke.

14 Claims, 4 Drawing Sheets

(52) U.S. Cl.
    CPC ... *E05Y 2201/266* (2013.01); *E05Y 2201/716* (2013.01); *E05Y 2900/538* (2013.01); *E05Y 2999/00* (2024.05)

(58) Field of Classification Search
    USPC .......................................................... 224/412
    See application file for complete search history.

(56) References Cited

U.S. PATENT DOCUMENTS

| | | | | |
|---|---|---|---|---|
| 2012/0175204 | A1* | 7/2012 | Arnold | F16F 9/12 |
| | | | | 188/271 |
| 2019/0194997 | A1 | 6/2019 | Lee | |
| 2020/0101853 | A1* | 4/2020 | Nakanishi | B62D 25/105 |
| 2022/0212865 | A1* | 7/2022 | Zhou | B65F 1/1623 |
| 2024/0208384 | A1* | 6/2024 | Wakabayashi | B60N 2/793 |

FOREIGN PATENT DOCUMENTS

| | | |
|---|---|---|
| DE | 102018210355 A1 | 1/2020 |
| EP | 2287067 A2 | 2/2011 |
| GB | 1336499 | 11/1973 |
| JP | 2003137158 A | 5/2003 |

OTHER PUBLICATIONS

Written Opinion for corresponding application PCT/IB2022/050384 filed Jan. 18, 2022; Mail date May 4, 2022.

\* cited by examiner

STORAGE CONTAINER FOR A RIDEABLE SADDLE VEHICLE

TECHNICAL FIELD OF THE INVENTION

The present invention relates to the technical field of rideable saddle vehicles, and particularly relates to a storage container for a rideable saddle vehicle.

BACKGROUND OF THE INVENTION

The application of storage containers to some types of rideable saddle vehicles, such as motorcycles, for example, in particular but not exclusively motor scooters with two or more wheels, is known. For example, it is known to apply a storage top box to the rear part of rideable saddle vehicles, for example to allow storing one or more helmets in the storage top box.

Storage top boxes, commonly fastened to the rear axle of motorcycles, generally comprise a containment body defining the storage compartment, which comprises a base and a cover hinged to the base so that it can take an opening configuration, which allows access to the storage compartment, and a closing configuration, in which the cover closes the base at the top, thus preventing the storage compartment from being accessed. The base of the top box is usually a rigid body with a closed bottom which, as described above, is adapted to be closed at the top by the cover.

Storage top boxes are commonly used to transport objects, such as one or more helmets, but storage containers having a more specific purpose are also known, for example heated or cooled thermal containers for transporting food are also known. Storage containers integrated in the body of motorcycles in which the cover consists of the motorcycle saddle are also known.

Storage containers for rideable saddle vehicles of the prior art have the drawback of not ensuring an accurate control of the rotation movement of the cover in the opening and/or closing operations thereof.

It is a general object of the present description to provide a storage container for a rideable saddle vehicle which is capable of completely or at least partially overcoming the aforesaid drawback.

Such an object is achieved by a storage container for a rideable saddle vehicle, as generally defined in claim 1. Preferred and advantageous embodiments of the aforesaid storage container are defined in the appended dependent claims.

The invention will be better understood from the following detailed description of particular embodiments thereof, given by way of non-limiting example, with reference to the accompanying drawings briefly described in the following paragraph.

DETAILED DESCRIPTION

Equal or similar elements are indicated with the same numeral references in the accompanying drawings.

Figure 1:
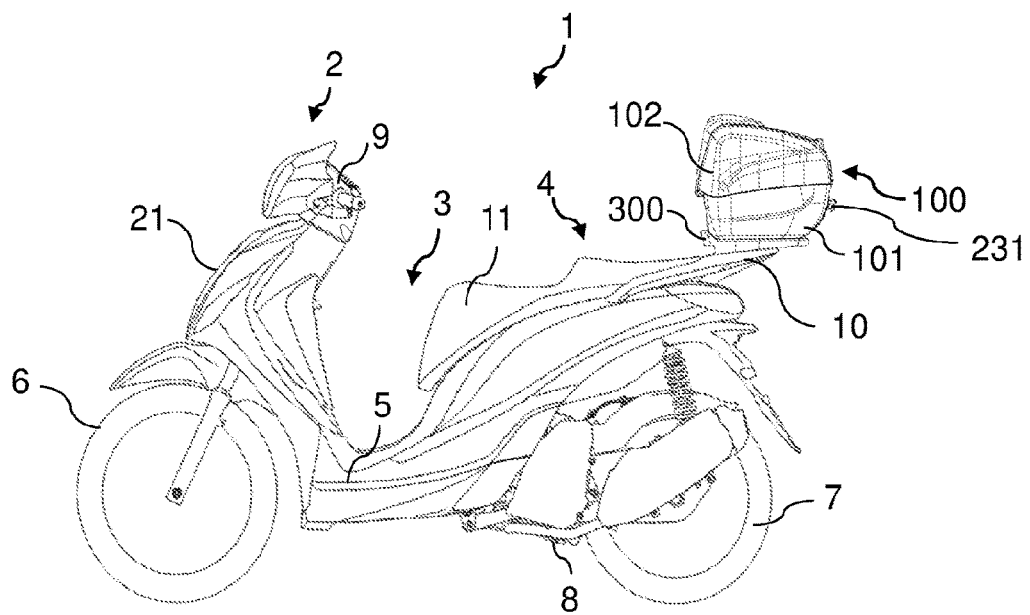
FIG. 1 shows a side plan view of a motorcycle comprising a non-limiting embodiment of a storage container, in which the storage container comprises a containment body shown in a closing configuration.
Figure 2:
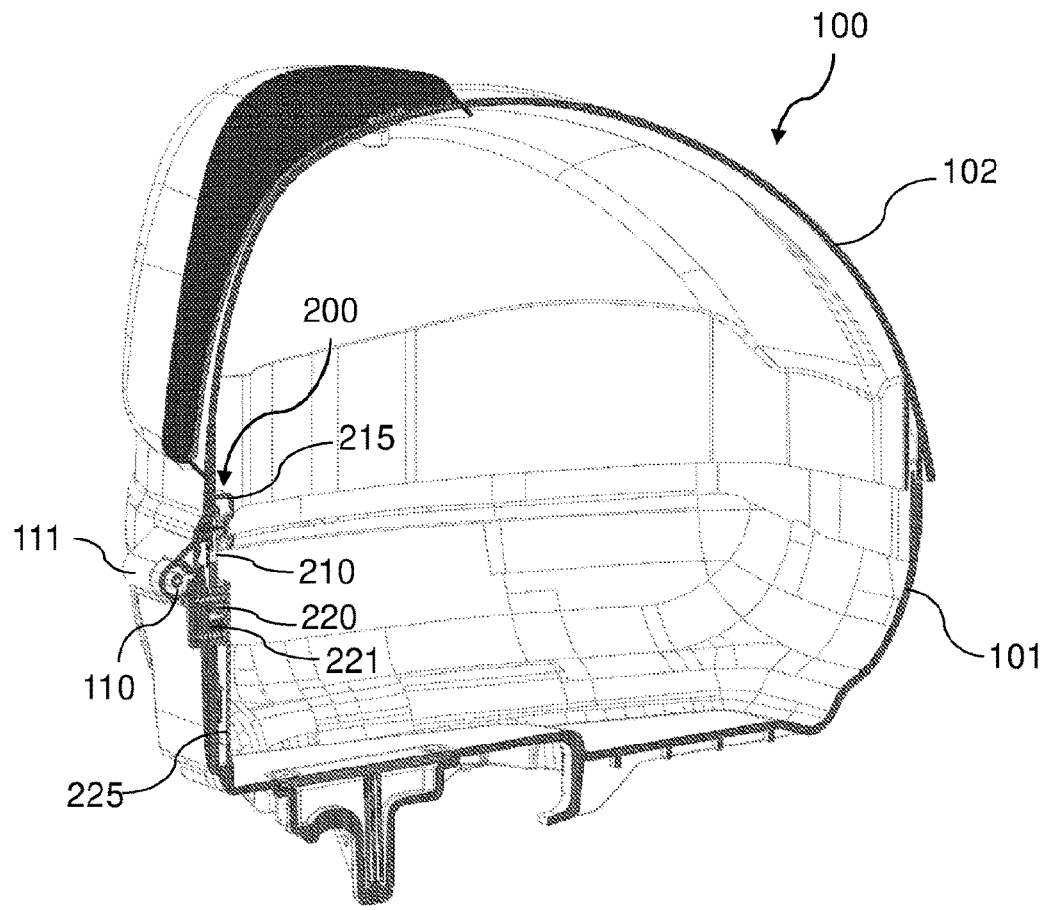
FIG. 2 shows a diagrammatic sectional view of the containment body in FIG. 1, in which a braking device is shown and in which the containment body is shown in a closing configuration.

FIG. 1 shows an embodiment of a rideable saddle vehicle 1 which in the particular example shown, is embodied, without introducing any limitation, by a two-wheel motorcycle, and in particular by a two-wheel scooter, having a front wheel 6 and a rear wheel 7.

Hereinafter, in the present description, without however introducing any limitation, reference will be made to a general motorcycle 1, meaning that the following description may be generally applied to any type of ridable saddle vehicle comprising:

a main body 2, 3, 4;
at least two wheels 6, 7 constrained to the main body 2, 3, 4;
an engine 8, for example, a heat or electric or hybrid traction engine, constrained to the main body 2, 3, 4 and operatively connected, directly or indirectly, to at least one of the two wheels 6, 7.

The main body 2, 3, 4 of motorcycle 1 has a front part 2, a tail part 4, and a central part 3 interposed between the front part 2 and the tail part 4. The central part 3 comprises, for example a saddle 11 and preferably a treadable footboard 5.

In the example, the front part 2 comprises a front shield 21, a steering handlebar 9, the front wheel 6.

According to a preferred non-limiting embodiment, the tail part 4 comprises a luggage carrier 10.

Motorcycle 1 further comprises a storage container 100 preferably and not limitedly fastened to the tail part 4 of motorcycle 1, and more preferably to the luggage carrier 10 of motorcycle 1. For example, the storage container 100 comprises a containment body 101, 102 defining the storage compartment and which comprises a base 101 and a cover or any hatch 102 (hereinafter "cover", also in the claims, without thereby introducing any limitation) hinged to base 101 so that it can take an opening configuration, allowing access to the storage compartment, and a closing configuration, in which cover 102 closes the base 101, thus preventing the storage compartment from being accessed. For example, the containment body 101, 102 is shaped like a top box and cover 102 closes the base 101 at the top.

According to a first embodiment, the storage container 100 comprises a fastening base 300, such as a fastening plate, for example, adapted and configured to fasten, preferably removably, the storage container 100 to the luggage carrier 10 of motorcycle 1. As inherently known, the aforesaid fastening base 300 can be mechanically coupled to the luggage carrier 10 of motorcycle 1 by means of an anti-tampering fastening system, for example a system of screws or bolts which are inaccessible to be unscrewed or removed or released when the storage container is fastened to the fastening base 300. In turn, the storage container 100, and in particular its base 101, can be mechanically coupled to the fastening base 300 through removable coupling means, which are known per se to those skilled in the art.

According to an alternative embodiment, the storage container 100 is directly fastened to the luggage carrier 10 of motorcycle 1, that is without the inclusion of the fastening base 300, through removable coupling means which are known per se to those skilled in the art. These removable coupling means allow fastening the base 101 of the storage container 100 directly to the luggage carrier of motorcycle 1, for example.

According to an advantageous and non-limiting embodiment, both if the fastening base 300 is provided and if it is not provided, the aforesaid coupling means belong to an integrated opening/closing system of cover 102 and fastening/removing system of the containment body 101, 102 to/from motorcycle 1, as described in co-pending European Patent Application filed under No. 20213601.6 and herein entirely incorporated for reference. Other examples of storage containers comprising integrated closing/opening and fastening/removing systems are described in Patent Applications WO2009101470A1 and WO2012052919A1, for example.

As inherently known, the storage container 100 comprises a lock assembly 230 adapted to lock container 100 in the closing configuration. The lock assembly can be operated by a key 231 and/or by an electromechanical system, for example, which allows operating the lock assembly 230 by means of a control button.

Cover 102 is hinged to base 101 and is adapted to be pivotally moved along a stroke which extends between an angular closing position and an angular opening position. Therefore, such a stroke is an angular stroke. For example, the angular closing position and the angular opening position are angularly spaced apart from each other by an angle between 80° and 180°, for example between 90° and 140°, preferably between 90° and 120°.

The storage container 100 comprises at least one braking device 200 coupled to, or integrated in, the containment body 101, 102 which is adapted and configured to slow down the movement of cover 102 along at least part of the angular stroke. According to a possible embodiment, the braking device 200 is adapted and configured to slow down the movement of cover 102 along the entire, or along almost the entire, angular stroke thereof. Almost the entire angular stroke means, for example, along an extension which is greater than 80% or 90% of the angular stroke.

According to an advantageous embodiment, the storage container 100 comprises two, or at least two, braking devices 200, for example arranged in parallel with each other.

According to an embodiment, the braking device 200 is arranged inside the containment body 101, 102.

A particularly advantageous embodiment is that in which the storage container 100 comprises at least one elastic element 110 adapted to apply a thrust force to cover 102 which, from the closing position, tends to push cover 102 towards the opening position. Such an elastic force allows bringing and/or keeping the cover 102 in the opening position, for example. Preferably, said at least one elastic element 110 comprises at least one torsion spring operatively interposed between base 101 and cover 102.

The braking device 200 advantageously allows reducing the acceleration imparted by the elastic element 110 to cover 102, in the movement of cover 102 from the closing position to the opening position, thus making such a movement less abrupt and more fluid. However, it is worth noting that although the provision of the braking device 200 in combination with the provision of the elastic element 110 is particularly advantageous, the provision of the braking device 200 without the aforesaid elastic element 110 in any case is advantageous. Indeed, the braking device 200 allows slowing down the acceleration of cover 102 in the closing movement, thus avoiding it from strongly impacting base 101 due to the gravity or wind or excessive force imparted by a user. Thus, benefits are obtained in terms of a decrease in the probability of damaging the storage container 100, in terms of decreasing noise and in terms of increasing safe use by the user because injury or pain due to crushed limbs, in particular hands or fingers, are avoided in the latter case.

According to an embodiment, the containment body 101, 102 of the storage container 100 comprises at least one hinge 111, for example a cylindrical hinge, adapted to pivotally couple cover 102 to base 101. The elastic element 110 is conveniently integrated in hinge 111 in such an embodiment. In the particular example shown in the drawings, without thereby introducing any limitation, the containment body 101, 102 comprises two hinges 111, which preferably are axially spaced apart from each other and in each of which a respective elastic element 110 preferably is integrated.

According to an advantageous embodiment, the braking device 200 is configured to oppose the movement, in particular the rotation, of cover 102 by applying a friction force, in particular during the movement and notably during the rotation of cover 102 with respect to base 101. Preferably, the braking device 200 comprises at least one rack element 210 and at least one toothed wheel 220 operatively coupled to each other. The toothed wheel 220 is an idler wheel, for example.

Preferably, one of the rack element 210 and the toothed wheel 220 is integral with base 101 of the storage container 100 and the other of the rack element 210 and the toothed wheel 220 is integral with cover 102. In the particular example shown in the drawings, the toothed wheel 220 is integral with base 101 and is pivotally connected to base 101, while the rack element 210 is integral with cover 102, for example having a first end portion 213 fastened to cover 102 and an opposite second free end portion 218. The second free end portion 218 slides with respect to base 101.

For example, the first end portion 213 includes a hole 214 crossed by a fastening element such as a screw or a plug or a rivet, for example, which is insertable into, or fastened to, cover 102. The aforesaid end portion 213 is, for example covered by a cap 215 preferably provided with a hole 216 crossed by the aforesaid fastening element and axially aligned with hole 214 of the end portion 213.

According to an embodiment, the toothed wheel 220 is pivotally coupled to a support element 221, such as a support plate 221 fastened to base 101 or to cover 102, for example. In the particular example shown in the drawings, the support element 221 is fastened to base 101, for example by means of fastening means 222 such as screws, in particular two screws 222, or similar fastening elements or in general adapted to stably fasten the support element 221 to base 101 or to cover 102.

According to a particularly advantageous embodiment, the rack element 210 has an elongated slit 211 delimited by at least one at least partially toothed slit edge 212. Conveniently, the toothed wheel 220 is arranged inside slit 211 to be engaged with the rack element 210.

According to an advantageous embodiment, the rack element 210 is flexible, in particular elastically flexible. For example, the rack element 210 is plate-like or ribbon-like and is made of plastic or metal material and is configured to elastically bend during the rotation of cover 202 with respect to base 101.

Figure 3:
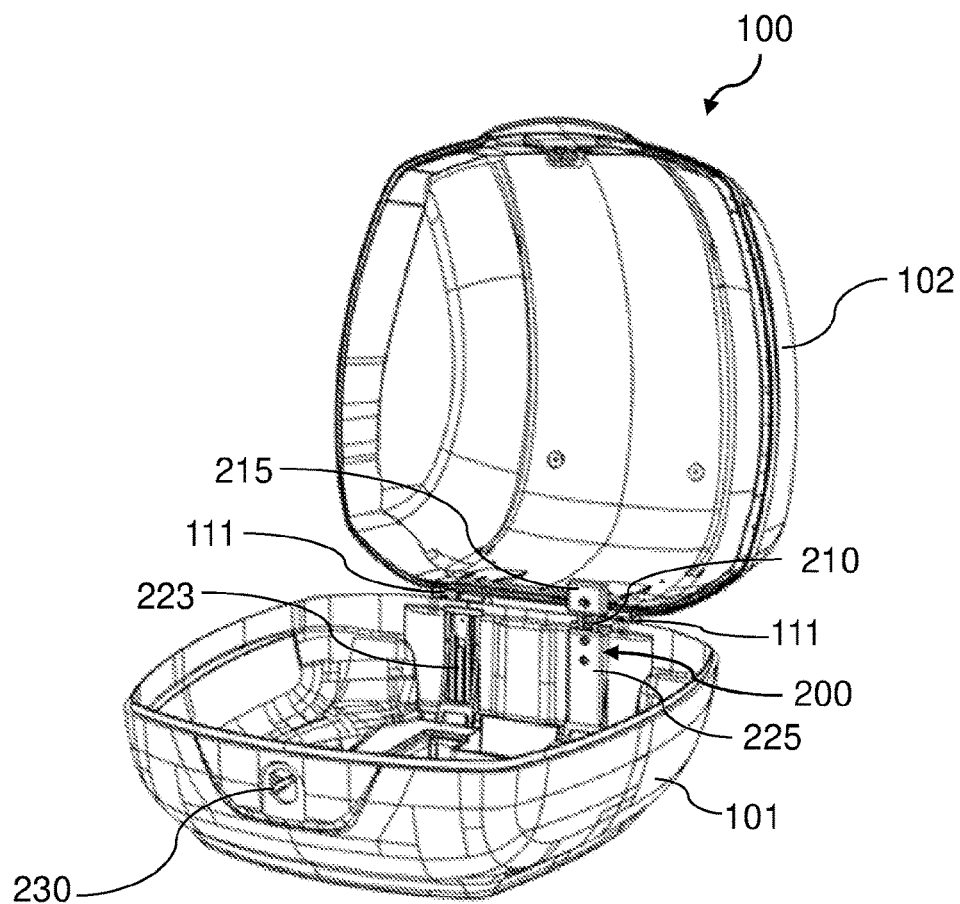
FIG. 3 shows an axonometric view of the containment body in FIG. 1, in which the containment body is shown in an opening configuration and in which a braking device is shown.
Figure 4:
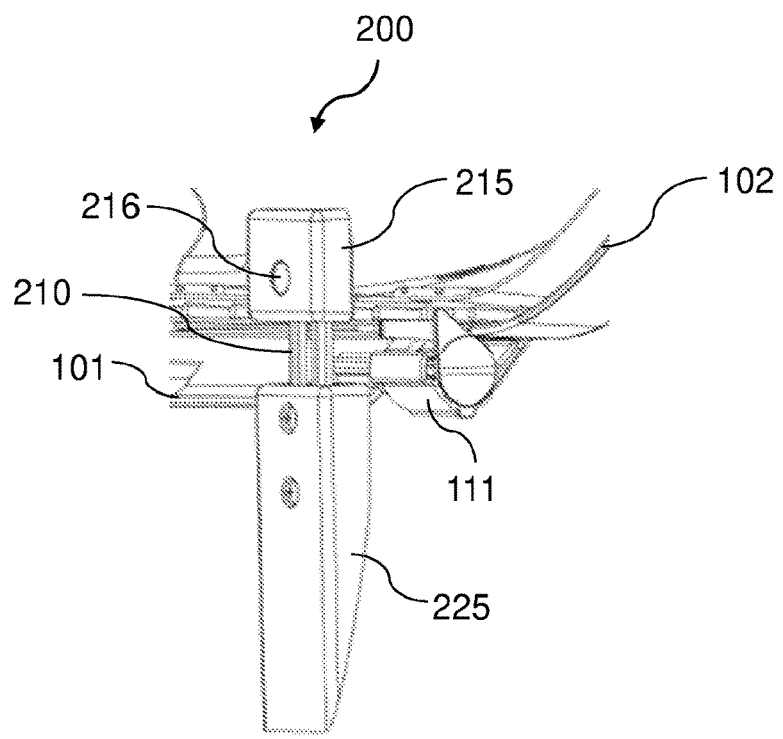
FIG. 4 is an enlarged view of the braking device in FIG. 3.
Figure 5:
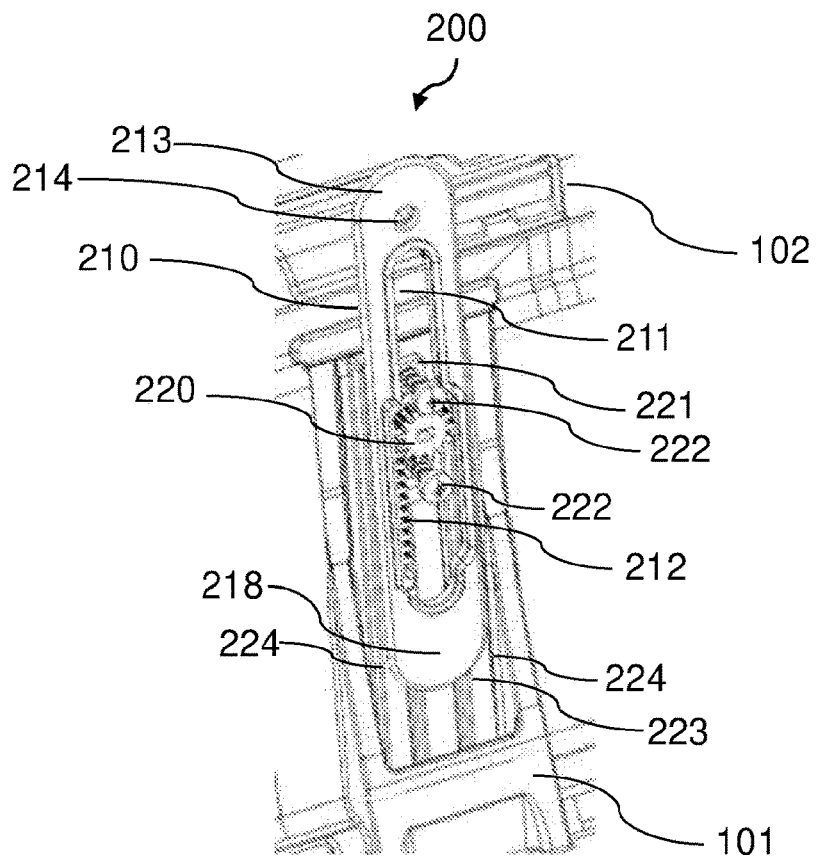
FIG. 5 is an enlarged view of the braking device in FIG. 3, from which certain parts have been removed and in which the braking device is shown coupled to the containment body.
Figure 6:
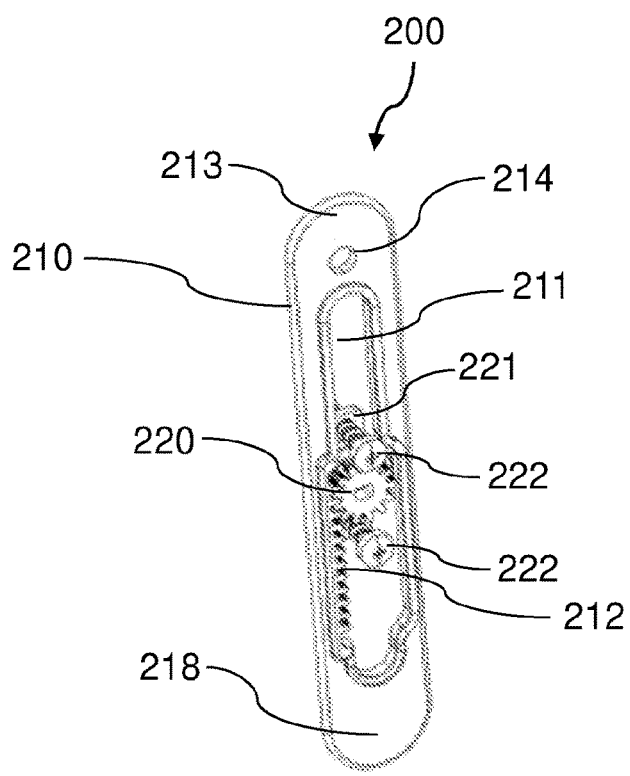
FIG. 6 is a view similar to that in FIG. 5, from which the containment body was omitted.

According to a particularly advantageous embodiment, the storage container 100 comprises a sliding seat 223 in which the rack element 210 slides. Such a sliding seat 223 is, for example delimited by two opposing side guide walls 224. In the example, the sliding seat 223 is integrated in base 101, but in an alternative embodiment obtained by inverting the position of the rack element 210 and the toothed wheel 220, the sliding seat 223 could be integrated in cover 102. With reference to FIG. 3, it is worth noting that, in addition to a first braking device 200, a sliding seat 223 is shown for a second braking device which is identical or similar to the braking device 200 and which was omitted from the drawing by way of explanation.

The toothed wheel 220 is housed inside the sliding seat 223. The sliding seat 223 defines a guide for the flexible rack element 210. The sliding seat 223 allows the flexible rack element 210 and the toothed wheel 220 to always remain meshed with each other.

According to an advantageous embodiment, the sliding seat 223 is covered by a casing 225, which in the example depicted in the drawings, is fastened to base 101 inside of the containment body 101, 102. Casing 225 prevents an undesired intrusion of foreign bodies in the braking device 200, thus preventing undesired locking or malfunctioning thereof.

Therefore, according to the above explanation, it may be understood how a storage container 100 of the above-described type allows achieving the objects mentioned above with reference to the prior art.

Figure 7:
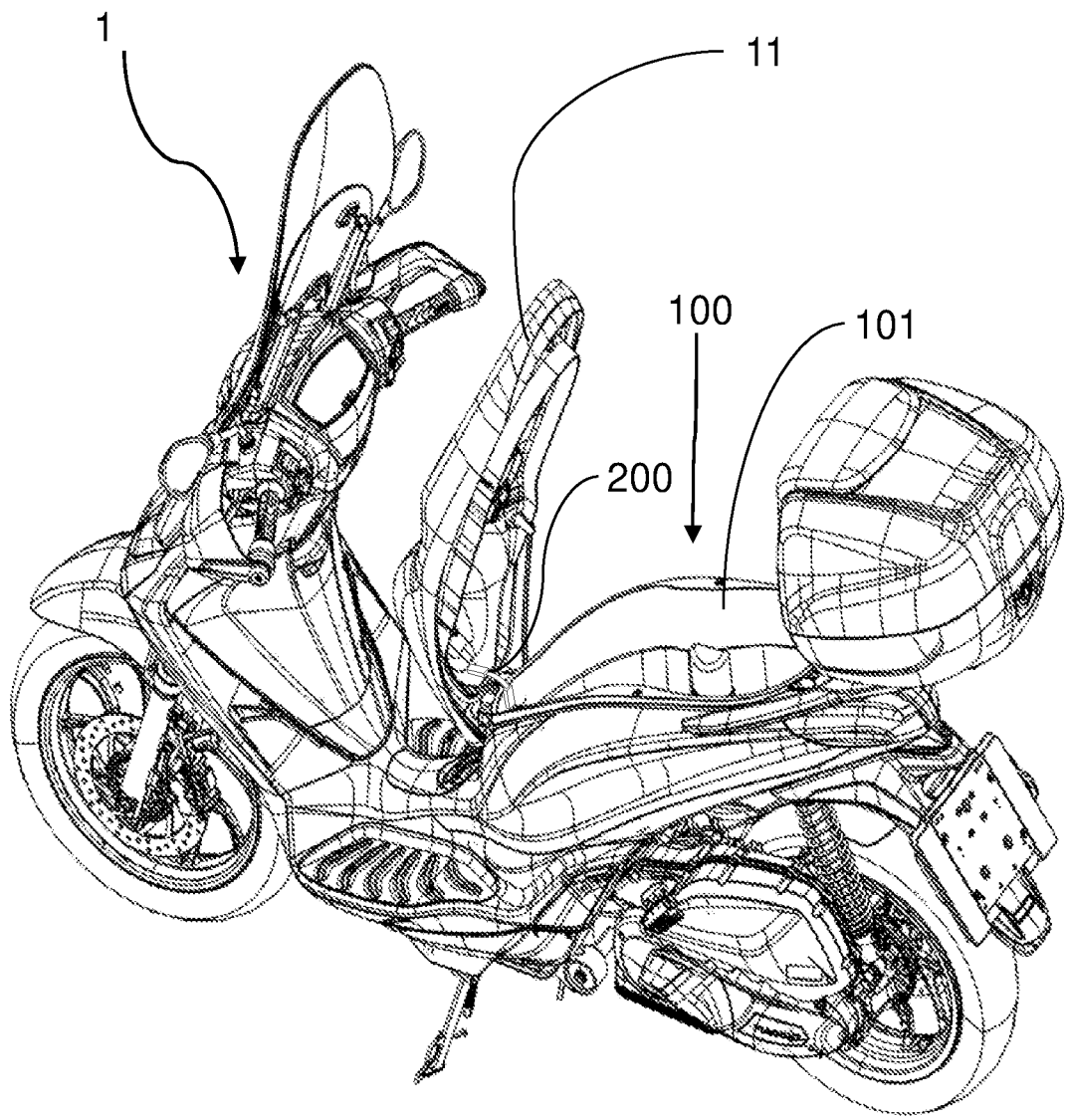
FIG. 7 is an axonometric view of a motorcycle comprising a further non-limiting embodiment of a storage container, in which the storage container is arranged in the body of the motorcycle and is shown in an opening configuration.

It is also an object of the present invention to provide a rideable saddle vehicle 1 comprising a storage container 100 arranged below a saddle 11, as shown in FIG. 7. The storage container 100 comprises a containment body 101 and saddle 11 is hinged to the containment body 101 or to vehicle 1. Saddle 11 is configured to be moved along a stroke, in particular an angular stroke, which extends between an angular closing position and an angular opening position. The storage container 100 comprises at least one braking device 200 coupled to, or integrated in, the containment body 101 which is adapted and configured to slow down the movement of saddle 11 along at least part of said stroke.

The thus-conceived storage compartment arranged below saddle 11 is similar to the storage container 100 for a rideable saddle vehicle 1 described above with reference to FIGS. 1 to 6, with the substantial difference that the cover of the storage container 100 here consists of saddle 11, which may be hinged to the body of container 101 or to another element of the vehicle, such as the frame of the vehicle itself, for example. For the rest, all the other technical features described above for the storage container 100 for a rideable saddle vehicle 1 are mutually applicable to the storage container 100 arranged below a saddle 11 referring to the example in FIG. 7 and are not herein repeated for brevity.

Without prejudice to the principle of the invention, the embodiments and the manufacturing details may be broadly varied with respect to the above description disclosed by way of a non-limiting example, without departing from the scope of the invention as defined in the appended claims.

The invention claimed is:

1. A storage container for a rideable saddle vehicle, the container comprising:
   a containment body having a base and a cover hinged to the base and adapted to be pivotally moved along a stroke extending between an angular closing position and an angular opening position,
   at least one braking device coupled to, or integrated in, the containment body which is adapted and configured to slow down the movement of the cover along at least part of said stroke;
   wherein said at least one braking device comprises at least one flexible rack element and at least one toothed idler wheel operatively coupled to each other; and
   wherein the storage container comprises a sliding seat inside which the rack element slides.

2. A storage container according to claim 1, wherein said at least one braking device is arranged inside said containment body.

3. A storage container according to claim 1, comprising at least one elastic element adapted to apply a thrust force to the cover which, from the closing position, tends to push the cover towards the opening position.

4. A storage container according to claim 3, wherein the containment body comprises at least one hinge adapted to pivotally couple the cover to the base, and wherein said at least one elastic element is integrated in said at least one hinge.

5. A storage container according to claim 3, wherein said at least one elastic element comprises at least one torsion spring operatively interposed between the base and the cover.

6. A storage container according to claim 1, wherein said at least one braking device is configured to oppose the movement of the cover by applying a friction force.

7. A storage container according to claim 1, wherein one of said rack element and said toothed wheel is integral with the base and the other of said rack element and said toothed wheel is integral with the cover.

8. A storage container according to claim 1, wherein said rack element has an elongated slit delimited by at least one at least partially toothed slit edge.

9. A storage container according to claim 8, wherein said toothed wheel is arranged inside said slit to engage said rack element.

10. A storage container according to claim 1, wherein said rack element is plate-like or ribbon-like.

11. A storage container according to claim 1, comprising a fastening base, said fastening base being attachable to a rideable saddle vehicle to allow the storage container to be fastened to the vehicle.

12. A rideable saddle vehicle comprising a luggage carrier and a storage container according to claim 1, wherein the storage container is adapted and configured to be directly or indirectly fastened to the luggage carrier.

13. A rideable saddle vehicle comprising a storage container according to claim 1, wherein the storage container is arranged inside the vehicle and a saddle of the vehicle forms said cover.

14. A rideable saddle vehicle comprising a storage container according to claim 1, wherein the at least one flexible rack element is configured to elastically bend during the rotation of the cover with respect to the base.

* * * * *